W. A. BLACK.
TIRE CORE.
APPLICATION FILED FEB. 25, 1920.
1,384,508.
Patented July 12, 1921.
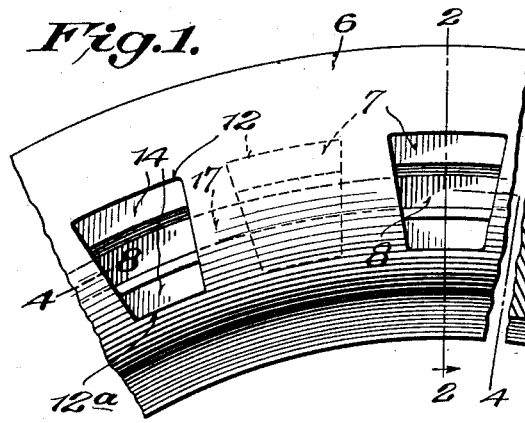
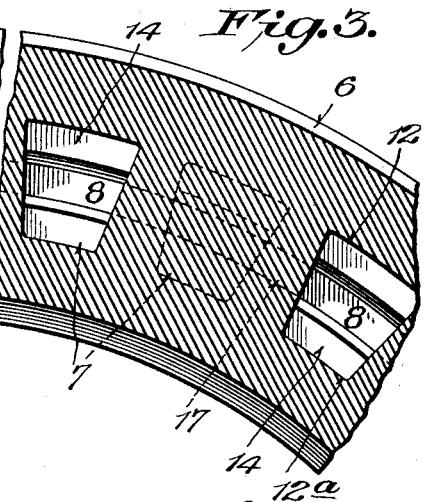
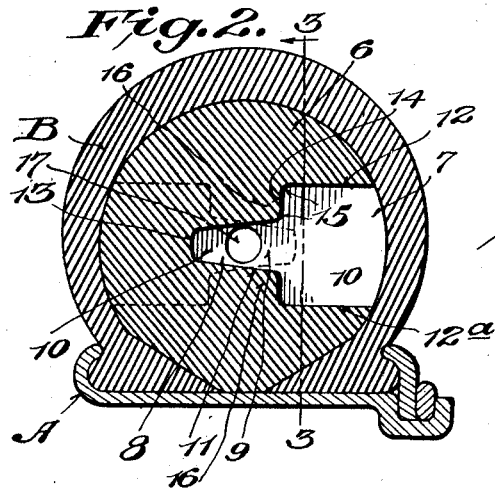
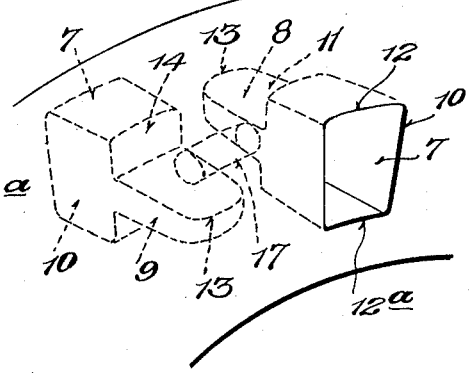
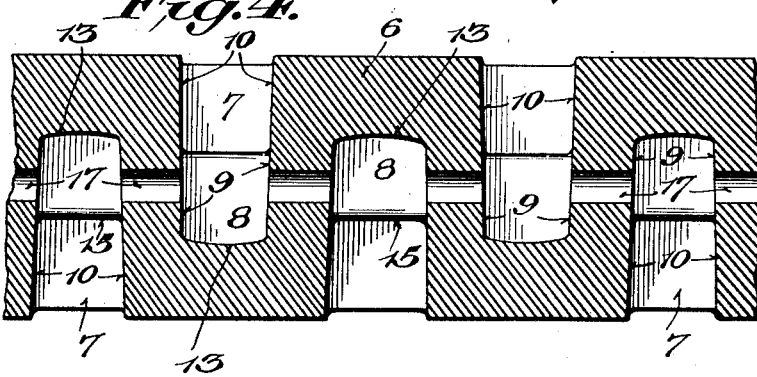
Witness
Chas. L. Griestauer
Inventor
Walter A. Black,
By H. Ralph Burton,
Attorney

UNITED STATES PATENT OFFICE.

WALTER A. BLACK, OF ROCKY FORD, COLORADO.

TIRE-CORE.

1,384,508. Specification of Letters Patent. Patented July 12, 1921.

Application filed February 25, 1920. Serial No. 361,197.

*To all whom it may concern:*

Be it known that I, WALTER A. BLACK, a citizen of the United States, residing at Rocky Ford, in the county of Otero and State of Colorado, have invented certain new and useful Improvements in Tire-Cores, of which the following is a specification.

This invention relates to resilient cores or fillers for use in tire-casings such as commonly are distended by air-filled inner tubes, and it provides a non-pneumatic core to keep such a casing distended and to sustain loads, thrusts, and stresses imposed thereon in service.

It is an object of the invention to form a core of that kind in such manner that it will be sufficiently sensitive to thrust and stress action resulting from irregularities of a roadway to prevent communication of shocks and vibration to the load sustained by the tire and at the same time will be so resistive thereto as to avoid injury to the tire as a whole or to its parts and prevent elimination or diminution of its resilient qualities.

When read in connection with the description herein, the characteristics of the invention will be apparent from the accompanying drawing, forming part hereof, wherein an embodiment of the invention is disclosed, for purposes of illustration.

While the disclosures herein exemplify what now is considered to be a preferable embodiment of the invention, it is to be understood that it is not the intention to be limited necessarily thereto in interpretation of the claims, as modifications within the limits of the claims can be made without departing from the nature of the invention.

Like reference-characters refer to corresponding parts in the views of the drawings, of which—

Figure 1 is a side view of the core;

Fig. 2 is a transverse sectional view of the core on the line 2—2, Fig. 1 as seen when associated with a wheel-rim and tire-casing;

Fig. 3 is a circumferential perpendicular sectional view of the core on the line 3—3, Fig. 2;

Fig. 4 is a sectional view of the core on the line 4—4, Fig. 1; and

Fig. 5 is a view of a fragment of the core as it would appear if its material were transparent.

Having more particular reference to the drawing, A designates a wheel-rim and B a tire-casing thereon, these parts being of ordinary commercial form.

For the purpose of filling such a casing and rendering it properly resistant and sensitive to loads, stresses, thrusts, and shocks imposed thereon, the invention provides a core 6, which is formed of any suitable resilient material, such as rubber, for example.

In order that the core may give the tire such resiliency as is required for absorption of stresses, thrusts, and shocks resulting from irregularities of a roadway and such resistance thereto as will prevent injurious flattening of the casing, the core is formed in a particular manner with a plurality of air-chambers.

Parts of these chambers, the recesses or cavities 7 in the core open to the sides thereof and are arranged to be closed by the casing. In circumferential section, each recess or cavity 7 is of substantially keystone shape—that is, it is wider at the outer end than at the end nearer the radial center of the core. It extends in substantially uniform size from the side of the core nearly to the center thereof.

A cavity or apex 8 continues from the inner end of each recess 7 farther into the core and beyond its center. It is of substantially the same width circumferentially as its major recess 7, and its side walls 9 are continuations of the corresponding walls 10 of the major recess. Its other opposite walls 11, which are tangential with respect to circles of the core, are nearer together than the corresponding walls 12 and 12ª of the major recess, and thus the apex is of less dimension radially of the core than the major recess. The walls 11 are spaced equally from a peripheral plane that is substantially midway between the walls 12 and 12ª of the major recess or slightly nearer to the minor wall 12ª than to the major wall 12. The opposite walls 11 of the apex converge slightly from the major recess toward the inner end of the apex, where they merge into a rounded end wall 13. Where the walls 11 of the apex and rear walls 14 and walls 12 and 12ª of the major recess merge or come together, they are slightly curved, as shown at 15. It will be seen that the minor cavity or apex 8 is somewhat wedge shape in section transverse of the core, and that it constitutes a minor extension of the major recess.

The major recesses or cavities 7 and their minor cavities or apexes 8 are respectively of the same size and shape. They are arranged in two series, one series on each side of the core. All of them are at substantially the same distance from the core periphery, and all of them in each series are spaced from one another at a distance greater than their circumferential width. Those of one series are directly opposite the core material between those of the other, whereby those of one series are staggered with relation to those of the other.

Two ribs 16, extending circumferentially and oppositely to each other throughout the circumference of the core, exist centrally therein between the inner walls 14 of the two series of major recesses 7 and on the opposite tangential sides of the apexes 8. They constitute continuous masses of material centrally in the core that are not interrupted by the major recesses thereof.

When a tire-casing incloses a core of this kind, it acts as a fluid-tight closure for the air-chambers in the major recesses and their minor cavities. In some classes of service, air confined in those chambers may be of such pressure as to interfere with proper compression of the core at the point of road contact. Therefore, for such service, and to equalize air compression in all of the chambers, they may be connected by passages 17 extending between adjacent apexes.

The major cavities are in the core to make it more sensitive to compression under weight and thrust and thus to increase its resiliency, and the minor recesses or apexes, which extend into the "heart" of the core, further increase resiliency without displacement of too much of the mass of core material. Under excess weight or thrust, the tangential walls of the apexes may come together, whereupon the core offers increased resistance thereto and prevents injurious further flattening of the tire.

In a core formed in the particular manner described, there is compensation for thrusts at the points of road contact, independently of, and without effect or distension in, other parts of the core.

Having thus described my invention, what I claim as new, and desire to secure by Letters Patent, is—

1. A core of resilient material containing a series of spaced chambers extending from each side thereof, the chambers of one series being positioned in staggered relation to those of the other, and individual chambers of each series being formed of a major cavity open to a side of the core and extending thereinto and a smaller cavity extending therefrom farther into the core between chambers of the other series.

2. A core of resilient material containing a series of spaced chambers extending from each side thereof, the chambers of one series being positioned in staggered relation to those of the other, each of the chambers of each series being formed of a major cavity open to a side of the core and extending thereinto and a smaller cavity extending therefrom farther into the core between chambers of the other series, and there being a circumferentially-extending rib adjacent to the smaller cavities and between the two series of major cavities.

3. A core of resilient material containing a series of spaced chambers extending from each side thereof, the chambers of one series being positioned in staggered relation to those of the other, each of the chambers of each series being formed of a major cavity open to a side of the core and extending thereinto and a smaller cavity extending therefrom farther into the core between chambers of the other series, and there being circumferentially-extending ribs above and below the two series of smaller cavities and between the two series of major cavities.

4. A core of resilient material containing a series of spaced chambers extending from each side thereof, the chambers of one series being positioned in staggered relation to those of the other, and the chambers being formed of major cavities each of which is open to a side of the core and extends thereinto and smaller cavities extending therefrom farther into the core between chambers of the other series, and air-passages connecting adjacent smaller cavities.

5. A core of resilient material characterized by a series of spaced chambers extending from each side thereof, the chambers of one series being positioned in staggered relation to those of the other, each of the chambers of each series being formed of a major cavity open to a side of the core and extending thereinto and a smaller cavity extending therefrom farther into the core between chambers of the other series, circumferentially-extending ribs above and below the two series of smaller cavities and between the two series of major cavities, and air-passages connecting smaller adjacent cavities.

6. A core of resilient material containing a series of spaced chambers extending transversely from each side thereof, individual chambers being formed of a major cavity open to a side of the core and a minor cavity extending therefrom farther into the core, the minor cavity being of substantially the same width circumferentially of the core as the major cavity and being of less thickness radially of the core than the major cavity.

In witness whereof, I affix my signature.

WALTER A. BLACK.